(12) United States Patent
Yamaji

(10) Patent No.: US 9,779,306 B2
(45) Date of Patent: Oct. 3, 2017

(54) CONTENT PLAYBACK SYSTEM, SERVER, MOBILE TERMINAL, CONTENT PLAYBACK METHOD, AND RECORDING MEDIUM

(71) Applicant: FUJIFILM Corporation, Tokyo (JP)

(72) Inventor: Kei Yamaji, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 211 days.

(21) Appl. No.: 14/736,634

(22) Filed: Jun. 11, 2015

(65) Prior Publication Data

US 2016/0019425 A1    Jan. 21, 2016

(30) Foreign Application Priority Data

Jun. 12, 2014    (JP) .................................. 2014-121321

(51) Int. Cl.
| | |
|---|---|
| G06K 9/00 | (2006.01) |
| G06K 9/52 | (2006.01) |
| G06T 7/60 | (2017.01) |
| G06T 19/00 | (2011.01) |
| H04N 5/93 | (2006.01) |

(Continued)

(52) U.S. Cl.
CPC ..... G06K 9/00751 (2013.01); G06K 9/00261 (2013.01); G06K 9/52 (2013.01); G06T 7/60 (2013.01); G06T 19/006 (2013.01); H04N 5/77 (2013.01); H04N 5/93 (2013.01); H04N 21/23418 (2013.01); H04N 21/234336 (2013.01); H04N 21/2743 (2013.01); H04N 21/41407 (2013.01); G06K 2009/00738 (2013.01)

(58) Field of Classification Search
CPC ............ H04N 9/8205; H04N 13/0066; H04N 21/858; G06T 2207/30204; G06T 7/20; G06T 7/60; G06K 9/52; G06K 9/00335; G06K 9/4652

See application file for complete search history.

(56) References Cited

U.S. PATENT DOCUMENTS

| | | | |
|---|---|---|---|
| 6,101,292 A | 8/2000 | Udagawa et al. | |
| 2007/0106675 A1* | 5/2007 | Watanabe ............ | G11B 27/322 |

(Continued)

FOREIGN PATENT DOCUMENTS

| | | |
|---|---|---|
| JP | 4174083 | 10/2008 |
| JP | 2013-239797 | 11/2013 |

*Primary Examiner* — Hung Dang
*Assistant Examiner* — Sunghyoun Park
(74) *Attorney, Agent, or Firm* — Young & Thompson

(57) ABSTRACT

Selected image data or specific information thereon is stored in association with moving image data as a management marker of a selected image. The selected image data is selected from among still image data extracted from the moving image data. When an output image of the selected image is captured, image analysis is performed on the captured image data to acquire a management marker of a captured image. A management marker of a selected image corresponding to the management marker of the captured image from among management markers of selected images stored in the storage is specified. Digest moving image data is generated by picking out a part of moving image data associated with the specific management marker. Control is performed so that a digest moving image is playbacked and displayed on the display section.

20 Claims, 9 Drawing Sheets

(51) Int. Cl.
    *H04N 21/2743*     (2011.01)
    *H04N 5/77*     (2006.01)
    *H04N 21/234*     (2011.01)
    *H04N 21/2343*     (2011.01)
    *H04N 21/414*     (2011.01)

(56) References Cited

U.S. PATENT DOCUMENTS

| | | | | |
|---|---|---|---|---|
| 2007/0123308 | A1* | 5/2007 | Kim | G01S 3/784 |
| | | | | 455/566 |
| 2008/0063363 | A1* | 3/2008 | Kientz | H04N 9/8205 |
| | | | | 386/221 |
| 2008/0152229 | A1* | 6/2008 | Wang | G08B 13/19691 |
| | | | | 382/192 |
| 2009/0116719 | A1* | 5/2009 | Jaffray | A61B 6/5217 |
| | | | | 382/131 |
| 2009/0185055 | A1* | 7/2009 | Ono | H04N 5/23245 |
| | | | | 348/234 |
| 2009/0257649 | A1* | 10/2009 | Yamauchi | G06F 17/30843 |
| | | | | 382/165 |
| 2010/0157050 | A1* | 6/2010 | Drive | G08B 13/19645 |
| | | | | 348/143 |
| 2011/0016150 | A1* | 1/2011 | Engstrom | G06F 17/30265 |
| | | | | 707/778 |
| 2011/0085778 | A1* | 4/2011 | Iwase | G11B 27/034 |
| | | | | 386/228 |
| 2012/0079578 | A1* | 3/2012 | Dachiraju | H04N 21/2225 |
| | | | | 726/7 |
| 2013/0230253 | A1* | 9/2013 | Stankiewicz | G06K 9/4671 |
| | | | | 382/195 |

* cited by examiner

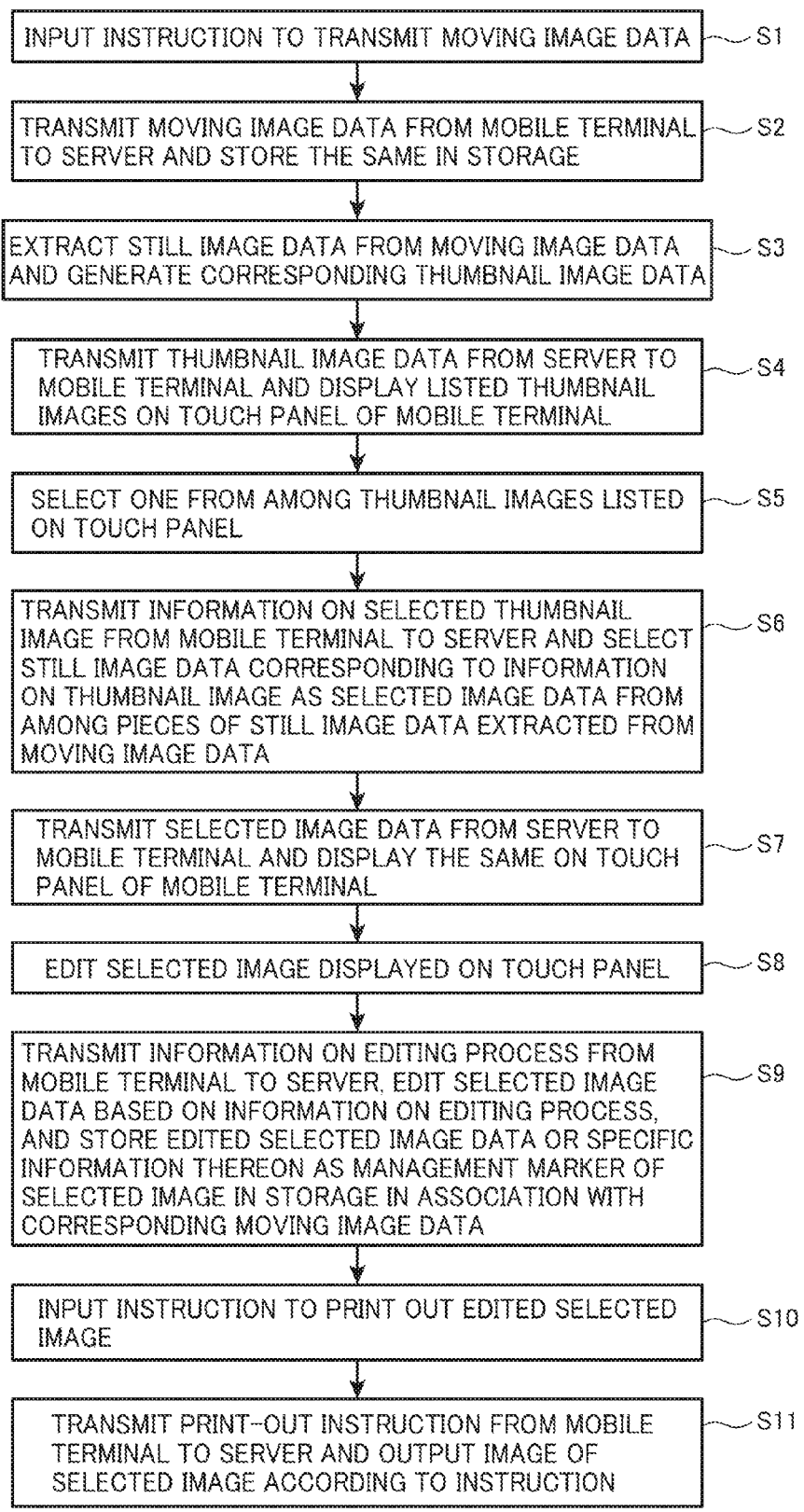

FIG. 6

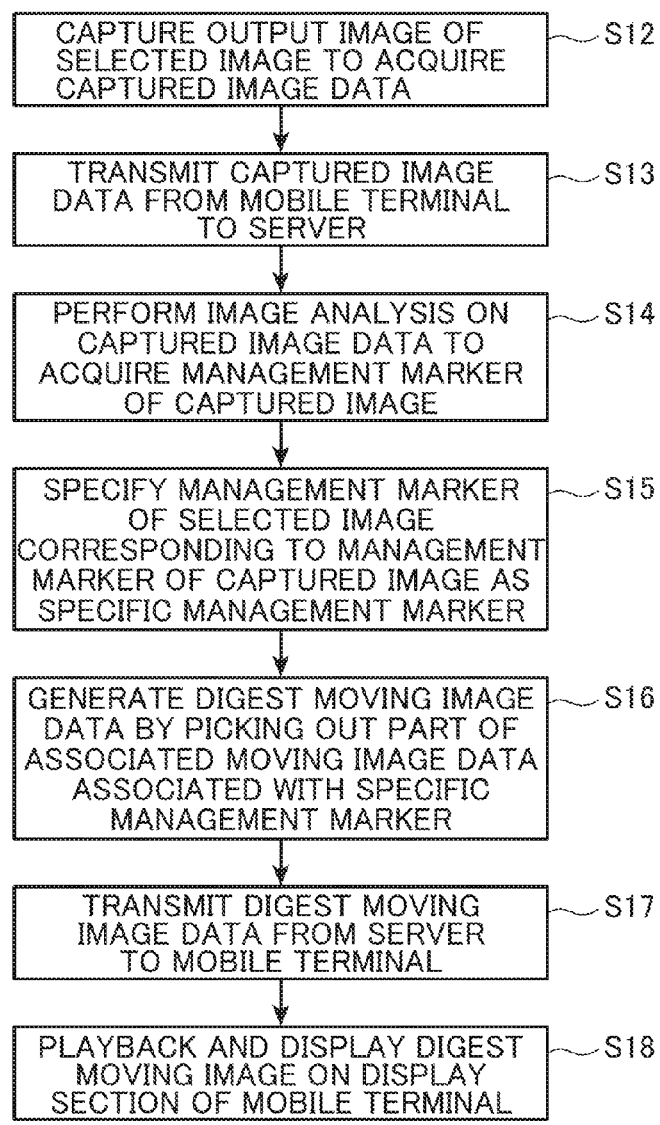

- S12 CAPTURE OUTPUT IMAGE OF SELECTED IMAGE TO ACQUIRE CAPTURED IMAGE DATA
- S13 TRANSMIT CAPTURED IMAGE DATA FROM MOBILE TERMINAL TO SERVER
- S14 PERFORM IMAGE ANALYSIS ON CAPTURED IMAGE DATA TO ACQUIRE MANAGEMENT MARKER OF CAPTURED IMAGE
- S15 SPECIFY MANAGEMENT MARKER OF SELECTED IMAGE CORRESPONDING TO MANAGEMENT MARKER OF CAPTURED IMAGE AS SPECIFIC MANAGEMENT MARKER
- S16 GENERATE DIGEST MOVING IMAGE DATA BY PICKING OUT PART OF ASSOCIATED MOVING IMAGE DATA ASSOCIATED WITH SPECIFIC MANAGEMENT MARKER
- S17 TRANSMIT DIGEST MOVING IMAGE DATA FROM SERVER TO MOBILE TERMINAL
- S18 PLAYBACK AND DISPLAY DIGEST MOVING IMAGE ON DISPLAY SECTION OF MOBILE TERMINAL

FIG. 7

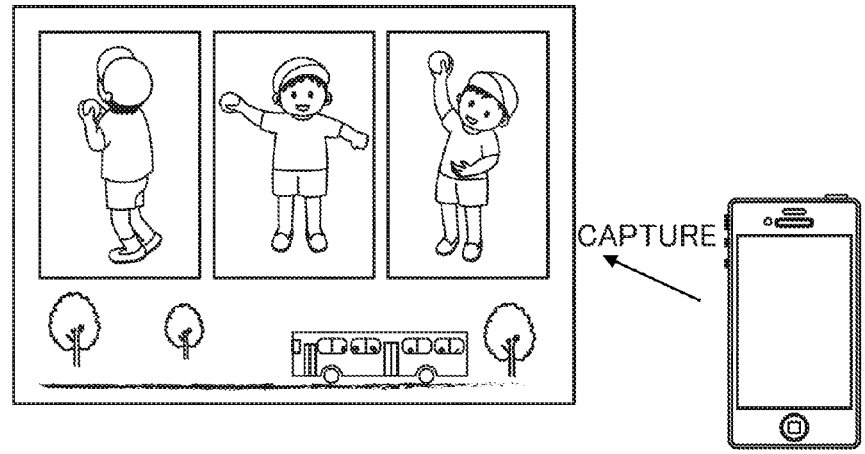

CONTENT PLAYBACK SYSTEM, SERVER, MOBILE TERMINAL, CONTENT PLAYBACK METHOD, AND RECORDING MEDIUM

CROSS-REFERENCE TO RELATED APPLICATIONS

The present application claims priority under 35 U.S.C. §119 to Japanese Patent Application No. 2014-121321, filed on Jun. 12, 2014. The above application is hereby expressly incorporated by reference, in its entirety, into the present application.

BACKGROUND OF THE INVENTION

The present invention relates to a content playback system, a server, a mobile terminal, a content playback method, and a recording medium for producing a digest moving image of a moving image associated with an output image (augmented reality (AR) print) by an augmented reality (AR) technology and playbacking and displaying the digest moving image.

Conventionally, there exist content playback systems for, with a mobile terminal such as a smart phone or a tablet terminal, imaging or capturing an output image that has been associated with AR content such as a moving image by the AR technique, displaying the imaged or captured output image on a display section of the mobile terminal, and playbacking and displaying a moving image or the like stored in association with the imaged or captured output image at the portion where the output image is displayed on the display section. However, such content playback systems that conventionally exist are mainly used for advertisements including promotional materials, and the pleasure of creating an output image associated with AR content is not very common for ordinary users.

Aside from that, when a moving image is playbacked, there are problems in that, for instance, the moving image is too long to see from beginning to end even if the moving image has only about a 30 second long; the user enjoys watching the moving image once or twice but does not feel like repeatedly watching the same; or when output images of AR content and normal output images are stored in an album, it is troublesome to carefully select output images of AR content one by one to playback the relevant AR content. Accordingly, there is a demand to extract only a necessary part from a moving image and playback and display the extracted part when the moving image is playbacked.

In this regard, even at present, it is possible to automatically extract a scene in which the face of a subject is clearly seen or a scene in which a subject makes a large movement and thereby generate a digest moving image.

However, since such automatic extraction is the processing performed in a uniform manner, despite the fact that, for example, a moving image features the landscape, a scene including a person who was imaged by accident is sometimes extracted. Thus, the user's preference is not reflected through the conventional automatic extraction, so that an automatically-extracted scene may not be a good scene the user likes indeed.

Now JP 4174083 B and JP 2013-239797 A are given as prior art literatures related to the present invention.

JP 4174083 B relates to an image processing apparatus for printing or displaying image data or the like stored in an image file. This literature describes a technique of, from moving image data, generating standard image data having a smaller data capacity than that of the moving image data, storing the generated standard image data and the moving image data in association with each other, and reading out and displaying the standard image data when read-out of the stored moving image data is instructed.

JP 2013-239797 A relates to an image processing apparatus for generating a digest of a moving image. This literature describes a technique of calculating a moving image evaluation value based on the contents of moving image data, evaluating a subject contained in input still image data to output a subject evaluation value, and extracting a part used for a digest from among parts of the moving image data corresponding to a recording date and time of the still image data based on the moving image evaluation value and the subject evaluation value.

SUMMARY OF THE INVENTION

JP 4174083 B and JP 2013-239797 A each describe generating a digest moving image from a moving image but neither thereof mentions a technique of storing a moving image and a still image extracted from the moving image in such a manner that the images are associated with each other, and when an output image of the still image is captured, playbacking the moving image associated with the still image; a technique of generating a digest moving image reflecting the user's preference from a moving image associated with a still image and playbacking and displaying the digest moving image; or a technique of generating a digest moving image in consideration of the playback time.

A first object of the invention is to solve the foregoing problems of the prior art and provide a content playback system, a content playback method, and a recording medium that enable to generate a digest moving image reflecting the user's preference from a moving image associated with a still image and playback and display the digest moving image.

A second object of the invention is, in addition to the first object above, to provide a content playback system, a server, a mobile terminal, a content playback method, and a recording medium that enable to generate a digest moving image also in consideration of the playback time.

In order to achieve the above objects, the invention provides a content playback system, comprising:
a server; and
a mobile terminal connected to the server via a network,
wherein the server comprises:
a storage, for one piece of moving image data or each of two or more pieces of moving image data, that stores a piece of selected image data or specific information thereon in association with the relevant piece of moving image data as a management marker of a selected image corresponding to the piece of selected image data, the piece of selected image data being a piece of still image data selected from among one or more pieces of still image data extracted from the piece of moving image data, and
the mobile terminal comprises:
an image capturing section that captures an output image obtained by outputting the selected image to thereby obtain captured image data, and
wherein the server further comprises:
an image analyzer that performs image analysis on the captured image data to acquire a management marker of a captured image corresponding to the captured image data;
a management marker specifying section that specifies, as a specific management marker, a management marker of a selected image corresponding to the management marker of the captured image from among management markers of selected images stored in the storage; and a digest moving image generator that generates digest moving image data by picking out a part of associated moving image data that is moving image data associated with the specific management marker, and the mobile terminal further comprises:

a display section that playbacks and displays a digest moving image corresponding to the digest moving image data; and a controller that performs control so that when the output image is captured by the image capturing section, a digest moving image corresponding to digest moving image data generated based on the captured image data is playbacked and displayed on the display section.

Also, the invention provides a server connected to a mobile terminal via a network, comprising:

a storage, for one piece of moving image data or each of two or more pieces of moving image data, that stores a piece of selected image data or specific information thereon in association with the relevant piece of moving image data as a management marker of a selected image corresponding to the piece of selected image data, the piece of selected image data being a piece of still image data selected from among one or more pieces of still image data extracted from the piece of moving image data;

an image analyzer that performs image analysis on captured image data obtained by capturing, by an image capturing section of the mobile terminal, an output image obtained by outputting the selected image to thereby acquire a management marker of a captured image corresponding to the captured image data;

a management marker specifying section that specifies, as a specific management marker, a management marker of a selected image corresponding to the management marker of the captured image from among management markers of selected images stored in the storage; and a digest moving image generator that generates digest moving image data by picking out a part of associated moving image data that is moving image data associated with the specific management marker.

Also, the invention provides a mobile terminal connected, via a network, to a server having a storage, for one piece of moving image data or each of two or more pieces of moving image data, that stores a piece of selected image data or specific information thereon in association with a piece of moving image data as a management marker of a selected image corresponding to the piece of selected image data, the piece of selected image data being a piece of still image data selected from among one or more pieces of still image data extracted from the piece of moving image data, the mobile terminal comprising:

an image capturing section that captures an output image obtained by outputting the selected image to thereby obtain captured image data;

a display section that playbacks and displays a digest moving image corresponding to digest moving image data when an image analyzer of the server performs image analysis on the captured image data to thereby acquire a management marker of a captured image corresponding to the captured image data, a management marker specifying section of the server specifies, as a specific management marker, a management marker of a selected image corresponding to the management marker of the captured image from among management markers of selected images stored in the storage, and a digest moving image generator of the server generates the digest moving image data by picking out a part of associated moving image data that is moving image data associated with the specific management marker; and a controller that performs control so that when the output image is captured by the image capturing section, a digest moving image corresponding to digest moving image data generated based on the captured image data is playbacked and displayed on the display section.

Also, the invention provides a content playback method, comprising:

a step of, for one piece of moving image data or each of two or more pieces of moving image data, storing in a storage a piece of selected image data or specific information thereon in association with a piece of moving image data as a management marker of a selected image corresponding to the piece of selected image data, the piece of selected image data being a piece of still image data selected from among one or more pieces of still image data extracted from the piece of moving image data;

a step of capturing with an image capturing section an output image obtained by outputting the selected image to thereby obtain captured image data;

a step of performing image analysis by an image analyzer on the captured image data to acquire a management marker of a captured image corresponding to the captured image data;

a step of specifying by a management marker specifying section, as a specific management marker, a management marker of a selected image corresponding to the management marker of the captured image from among management markers of selected images stored in the storage;

a step of generating digest moving image data by a digest moving image generator by picking out a part of associated moving image data that is moving image data associated with the specific management marker; and a step of performing control by a controller so that when the output image is captured by the image capturing section, a digest moving image corresponding to digest moving image data generated based on the captured image data is playbacked and displayed on a display section.

Also, the invention provides a non-transitory computer readable recording medium having recorded thereon a program for causing a computer to execute each of the steps of the content playback method according to above.

According to the present invention, a digest moving image is generated based on a selected image selected by the user and therefore, it is possible to generate a digest moving image reflecting the user's preference and playback and display the digest moving image on a display section of a mobile terminal.

BRIEF DESCRIPTION OF THE DRAWINGS

FIG. 4 is a flowchart of one example for showing the operation of the content playback system when content is generated and an output image of a selected image is output.

FIG. 6 is a flowchart of one example for showing the operation of the content playback system when a digest moving image is generated, playbacked and displayed.

FIG. 7 is a conceptual diagram of one example for showing one output image containing three selected images with shooting times close to each other being captured.

DETAILED DESCRIPTION OF THE INVENTION

A content playback system, a server, a mobile terminal, a content playback method, and a recording medium of the present invention are described below in detail with reference to preferred embodiments shown in the accompanying drawings.

Figure 1:
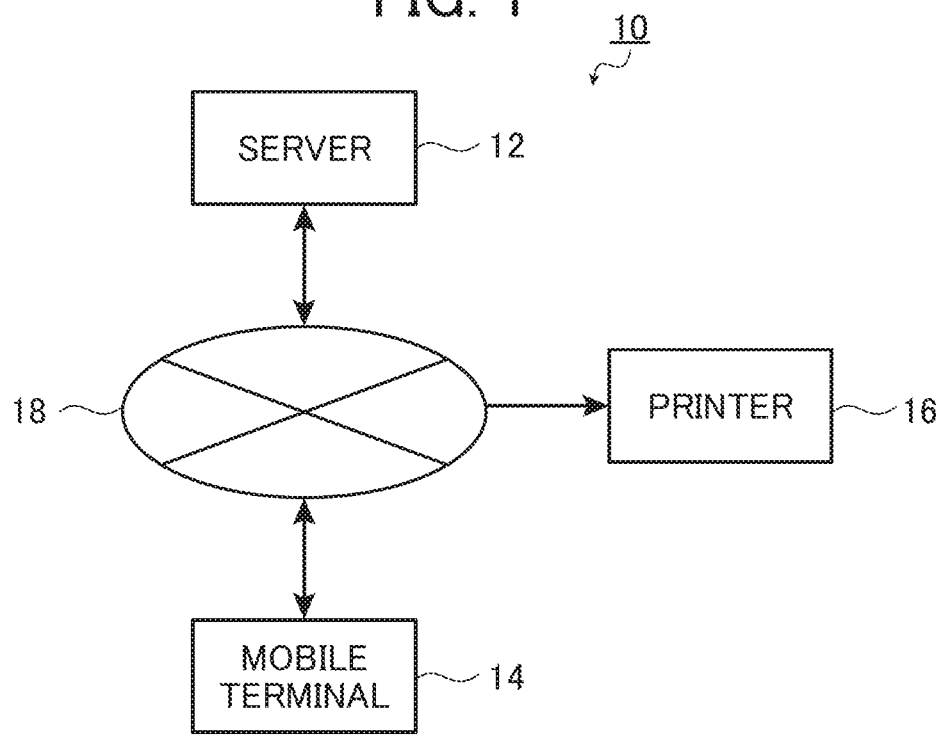
FIG. 1 is a block diagram of an embodiment for showing the configuration of a content playback system of the invention.

FIG. 1 is a block diagram of an embodiment for showing the configuration of a content playback system of the invention. A content playback system 10 shown in the drawing generates a digest moving image of a moving image associated with an output image of AR content when the output image is imaged or captured, and includes a server 12, a mobile terminal 14 and a printer 16. The server 12, the mobile terminal 14 and the printer 16 are interconnected via a network 18 such as the Internet.

Figure 2:
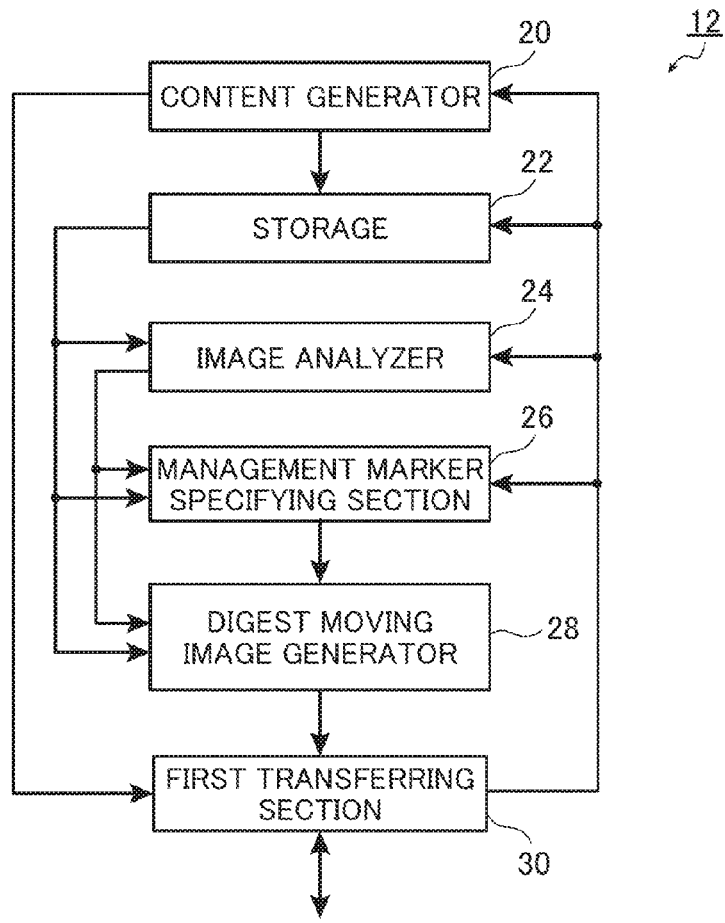
FIG. 2 is a block diagram of the embodiment for showing the configuration of a server shown in FIG. 1.

FIG. 2 is a block diagram of the embodiment for showing the configuration of the server shown in FIG. 1. The server 12 shown in the drawing includes a content generator 20, a storage 22, an image analyzer 24, a management marker specifying section 26, a digest moving image generator 28 and a first transferring section 30.

The content generator 20 extracts one or more pieces of still image data from one piece of moving image data or each of two or more pieces of moving image data and generates AR content having the relevant piece of moving image data associated with a piece of selected image data which is a piece of still image data selected by the user of the mobile terminal 14 from among the one or more pieces of still image data.

In this invention, the content generator 20 is not indispensable.

For one piece of moving image data or each of two or more pieces of moving image data, the storage 22 stores AR content generated by the content generator 20, that is, stores a piece of selected image data or specific information thereon in association with the relevant piece of moving image data as a management marker of a selected image corresponding to the piece of selected image data, the piece of selected image data being a piece of still image data selected by the user from among one or more pieces of still image data extracted from the relevant moving image data.

The management marker refers to a characteristic amount of an image acquired from image data by subjecting the image data to image analysis using a predetermined algorithm and includes, for example, edge information, edge position information and other information on a subject in the image. The management marker may be image data itself or may be specific information used to specify the image data. The specific information on image data may be any kind of information as long as it is useful for specifying selected image data from captured image data.

The image analyzer 24 performs image analysis on captured image data, which will be described later, to acquire a management marker of a captured image corresponding to the captured image data.

The management marker specifying section 26 specifies, as a specific management marker, a management marker of a selected image corresponding to a management marker of a captured image acquired by the image analyzer 24 from among management markers of selected images stored in the storage 22. For instance, the management marker specifying section 26 specifies a management marker of a selected image corresponding to a management marker of a captured image by conducting a search within management markers of selected images stored in the storage 22 based on the management marker of the captured image.

The digest moving image generator 28 generates digest moving image data by picking out a part of associated moving image data that is moving image data associated with a specific management marker. In other words, the digest moving image generator 28 generates digest moving image data from associated moving image data based on a specific management marker, i.e., based on still image data selected by the user from among one or more pieces of still image data extracted from the moving image data, or specific information on the still image data.

The first transferring section 30 is used to transfer various types of data including moving image data, captured image data, digest moving image data and the like between the server 12 and the mobile terminal 14.

Figure 3:
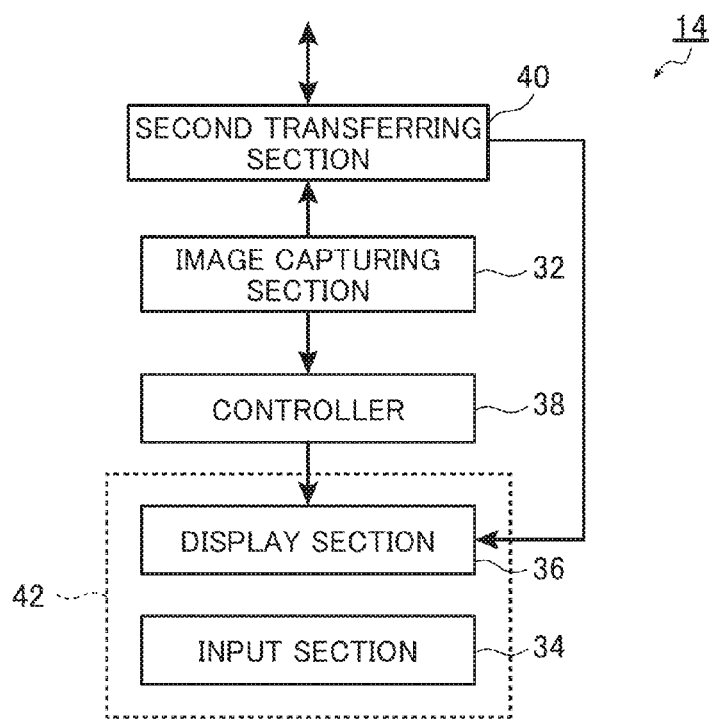
FIG. 3 is a block diagram of the embodiment for showing the internal configuration of a mobile terminal shown in FIG. 1.

FIG. 3 is a block diagram of the embodiment for showing the internal configuration of the mobile terminal shown in FIG. 1. The mobile terminal 14 is a portable terminal such as a smart phone, a tablet terminal, or the like used by the user and as shown in the figure, includes an image capturing section 32, an input section 34, a display section 36, a controller 38 and a second transferring section 40.

Note that two or more mobile terminals 14 used by different users may be provided.

The image capturing section 32 images or captures, for instance, an output image (AR print) obtained by outputting a selected image to thereby obtain captured image data.

The input section 34 is used by the user to input various instructions.

The display section 36 is used to playback and display a digest moving image corresponding to digest moving image data.

In this embodiment, a touch panel 42 constitutes the input section 34 and the display section 36.

The controller 38 performs the control so that when an output image is imaged or captured by the image capturing section 32, a digest moving image corresponding to digest moving image data generated based on captured image data is playbacked and displayed on the display section 36.

The controller 38 may playback a digest moving image on the display section 36 by means of the AR technology (AR playback) or without the AR technology (normal playback). In the case where a digest moving image is playbacked through the AR playback, the controller 38 performs the control so that a captured output image is displayed on the display section 36 and a digest moving image is playbacked at the portion where the output image is displayed on the display section 36. On the other hand, in the case where a digest moving image is playbacked through the normal playback, the controller 38 performs the control so that a digest moving image is playbacked over the entire screen or in a window of any size on the display section 36.

The second transferring section 40 is used to transfer various types of data including moving image data, captured image data, digest moving image data and the like between the mobile terminal 14 and the server 12.

Next, the explanation will be made on the operation of the content playback system 10 when AR content is generated and an output image of a selected image is output with reference to FIG. 4.

Figures 5A, 5B, 5C:
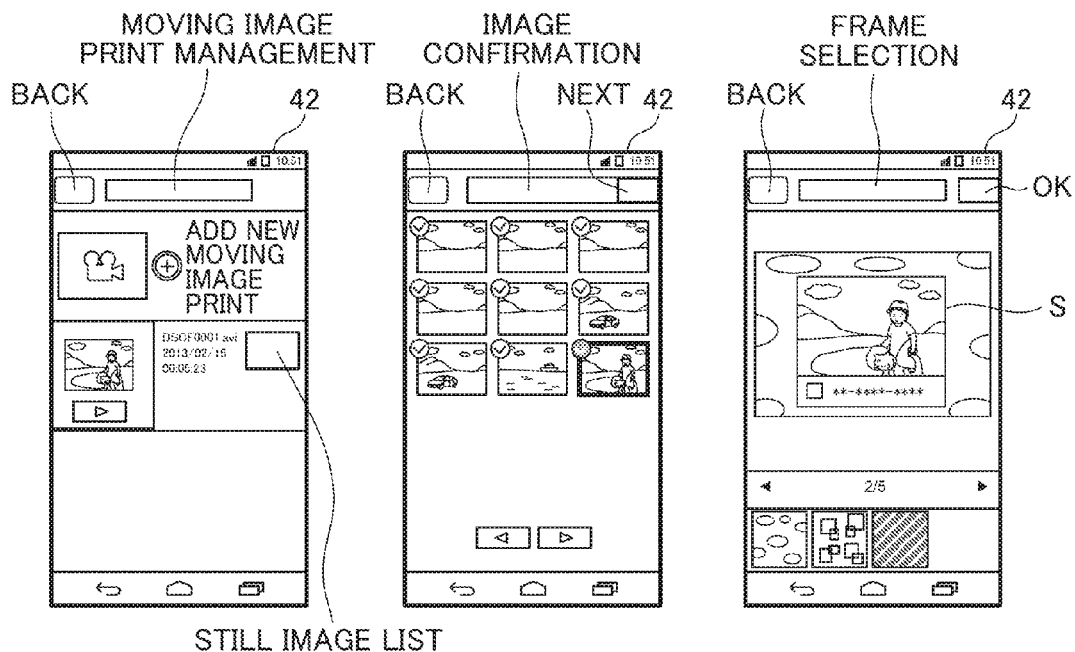
FIGS. 5A to 5E are conceptual diagrams showing one example of a display screen of a display section of the mobile terminal.

First, while viewing a moving image print management screen displayed on the touch panel 42 (display section 36) as shown in FIG. 5A, the user operates the touch panel 42 (input section 34) to input an instruction to transmit moving image data (Step S1).

The moving image data the user has instructed to transmit is transmitted by the second transferring section 40 from the mobile terminal 14 to the server 12 via the network 18. In the server 12, the moving image data transmitted from the mobile terminal 14 is received by the first transferring section 30 and stored in the storage 22 (Step S2).

Subsequently, the content generator 20 extracts one or more pieces of still image data from the received moving image data and generates the corresponding piece or pieces of thumbnail image data of the extracted one or more pieces of still image data (Step S3).

The generated one or more pieces of thumbnail image data are transmitted from the server 12 to the mobile terminal 14. In the mobile terminal 14, thumbnail images corresponding to the received one or more pieces of thumbnail image data are listed in an image confirmation screen on the touch panel 42 (display section 36) as shown in FIG. 5B (Step S4).

Subsequently, the user operate the touch panel 42 (input section 34) to select one from among the listed one or more thumbnail images on the touch panel 42 (display section 36) (Step S5). In the example shown in FIG. 5B, it is assumed that the thumbnail image surrounded by a thick frame at the bottom right is selected.

Information on the selected thumbnail image is transmitted from the mobile terminal 14 to the server 12. In the server 12, the content generator 20 selects a piece of still image data corresponding to the received information on the thumbnail image as selected image data from among the one or more pieces of still image data extracted from the moving image data (Step S6).

The still image data extracted from the moving image data may be used in place of the thumbnail image data.

Subsequently, the selected image data is transmitted from the server 12 to the mobile terminal 14. In the mobile terminal 14, a selected image corresponding to the received selected image data is displayed on the touch panel 42 (display section 36) of the mobile terminal 14 (Step S7).

Subsequently, the user operates the touch panel 42 (input section 34) to edit the selected image displayed on the touch panel 42 (display section 36) (Step S8). The editing process carried out by the user includes, for instance, selection of a background frame to be a background of the selected image, which is made in a frame selection screen shown in FIG. 5C; and image correction, trimming, scaling, rotating and the like of the selected image, which is made in an image trimming screen shown in FIG. 5D.

Subsequently, information on the editing process is transmitted from the mobile terminal 14 to the server 12. In the server 12, the content generator 20 edits the selected image data based on the received information on the editing process. The edited selected image data or specific information thereon is stored as a management marker of the selected image in the storage 22 in association with the corresponding moving image data (Step S9).

Editing the selected image is not indispensable.

Figures 5D, 5E:
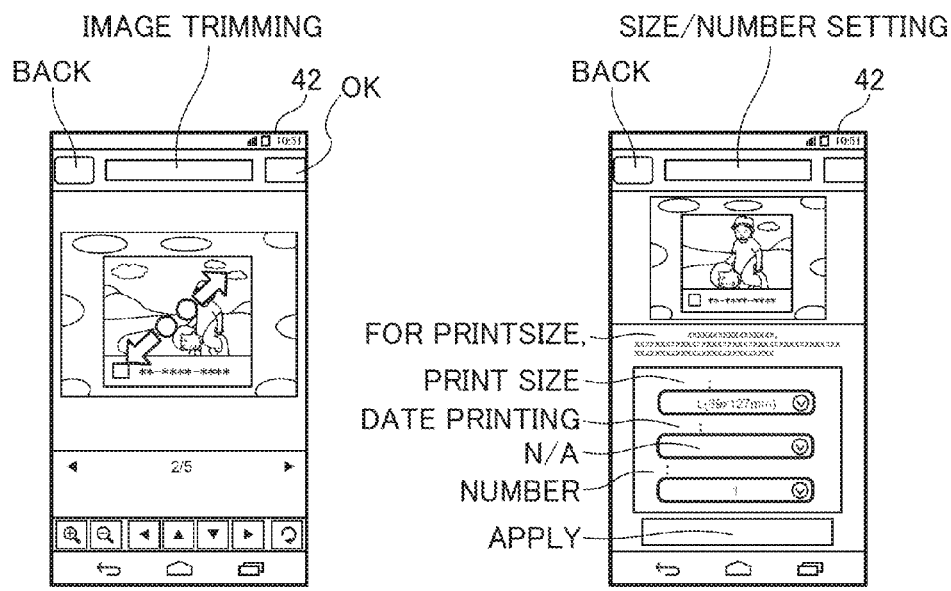

Subsequently, the user operates the touch panel 42 (input section 34) to set the print size, the number of prints and the like in a size and number setting screen shown in FIG. 5E and inputs an instruction to print out the edited selected image (Step S10).

The print-out instruction is transmitted from the mobile terminal 14 to the server 12. The selected image data according to the received print-out instruction is transmitted from the server 12 to the printer 16, whereupon the printer 16 outputs an output image of the selected image corresponding to the selected image data (Step S11).

The output image is delivered to the user.

Thus, AR content having the moving image data associated with the selected image data extracted from the moving image data is stored in the storage 22, while the output image of the selected image is output.

Next, the explanation will be made on the operation of the content playback system 10 when digest moving image data is generated and a digest moving image corresponding to the digest moving image data is playbacked and displayed with reference to FIG. 6.

First, the image capturing section 32 images or captures the output image of the selected image to acquire captured image data (Step S12). The captured output image is displayed on the touch panel 42 (display section 36) of the mobile terminal 14.

The acquired captured image data is transmitted by the second transferring section 40 from the mobile terminal 14 to the server 12 via the network 18. In the server 12, the captured image data transmitted from the mobile terminal 14 is received by the first transferring section 30 (Step S13).

Subsequently, the image analyzer 24 performs image analysis on the captured image data to acquire a management marker of a captured image corresponding to the captured image data (Step S14).

Subsequently, the management marker specifying section 26 specifies, as a specific management marker, a management marker of the selected image corresponding to the management marker of the captured image from among management markers of selected images stored in the storage 22 (Step S15).

Subsequently, the digest moving image generator 28 generates digest moving image data by picking out a part of associated moving image data that is the moving image data associated with the specific management marker (Step S16).

For example, the digest moving image generator 28 can generate digest moving image data by picking out, from the associated moving image data, a part corresponding to a previously-set time range that includes a shooting time of the selected image corresponding to the specific management marker.

When the selected image corresponding to the specific management marker is an image obtained by imaging a person and thus features the person, the digest moving image generator 28 can generate digest moving image data by picking out a part where the person shows up from the associated moving image data. In this case, the digest moving image generator 28 may generate digest moving image data by picking out, from the associated moving image data, a part where the person shows up in the same scene as a scene in the selected image corresponding to the specific management marker.

On the other hand, when the selected image is an image featuring the landscape such as an image with no person or an image in which a person is seen as a small figure near the edge of the captured image, the digest moving image generator 28 can generate digest moving image data by picking out a part where no person shows up from the associated moving image data. In this case, the digest moving image generator 28 may generate digest moving image data by picking out, from the associated moving image data, a part where no person shows up in the same scene as a scene in the selected image corresponding to the specific management marker.

Subsequently, the generated digest moving image data is transmitted from the server 12 to the mobile terminal 14. The mobile terminal 14 receives the digest moving image data transmitted from the server 12 (Step S17).

Once the digest moving image data is received, a digest moving image corresponding to the received digest moving image data is playbacked and displayed at the portion where the output image is displayed on the touch panel 42 (display section 36) of the mobile terminal 14 under control of the controller 38 (Step S18).

Thus, when the output image is captured, the management marker of the selected image corresponding to the management marker of the captured image is specified, whereafter the digest moving image is generated from the associated moving image associated with the specific management marker and playbacked and displayed at the mobile terminal 14.

In the content playback system 10, a digest moving image is generated based on a selected image selected by the user and therefore, it is possible to generate a digest moving image reflecting the user's preference and playback and display the digest moving image on the display section 36 of the mobile terminal 14.

When an output image of a selected image is output, an access key composed of a character string including figures or letters may be printed on the output image of the selected image. The access key is uniquely determined for each user. When a specific management marker is specified from among management markers of selected images stored in the storage 22, the access key input by a user serves to limit candidates to the range of management markers of selected images associated with a certain piece of moving image data transmitted to the server 12 by the user.

Next, the captured image will be explained with various examples.

In a possible case, for instance, selected images corresponding to two or more pieces of selected image data which have been selected by the user from among two or more pieces of still image data extracted from a piece of moving image data and whose shooting times fall within a time interval set in advance are contained in one output image in order to express the motion of a subject.

When such an output image is captured by the image capturing section 32 and when each of shooting times of a selected image corresponding to each of two or more specific management markers specified from each of the two or more selected images having been captured falls within a time interval set in advance, the digest moving image generator 28 can generate digest moving image data by picking out, from associated moving image data, a part corresponding to a time range between the earliest and latest shooting times of the selected images corresponding to the specified two or more specific management markers.

For instance, in the example shown in FIG. 7, three selected images taken at close shooting times are contained in one output image in order to express the motion of a child, assuming that, in the figure, the three selected images are arranged in the left to right order from the one with the earliest shooting time. In this case, the digest moving image generator 28 picks out a part corresponding to a time range between the shooting time of the left selected image and the shooting time of the right selected image from associated moving image data associated with management markers corresponding to the three selected images to thereby generate digest moving image data, for example.

In another possible case, selected images corresponding to two or more pieces of selected image data which have been selected by the user from among two or more pieces of still image data extracted from one piece of moving image data and in each of which a person is seen are contained in one output image.

When such an output image is captured and when a person is seen in each of the two or more selected images corresponding to the two or more specific management markers specified from each of the two or more selected images having been captured, the digest moving image generator 28 can generate digest moving image data by picking out, from associated moving image data, a part where each of the persons seen in each of the two or more selected images corresponding to each of the specified two or more specific management markers shows up.

For instance, when a person A is seen in the first selected image, a person B in the second selected image, and the persons A and B in the third selected image, a part where both or either of the persons A and B shows up is picked out from associate moving image data to generate digest moving image data.

Figure 8:
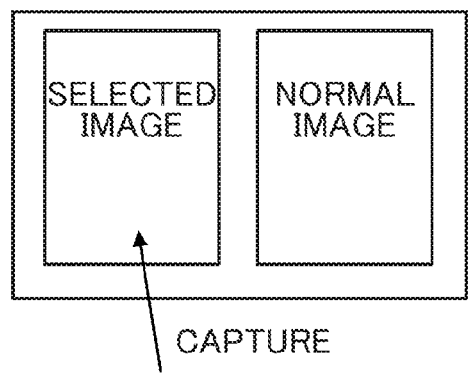
FIG. 8 is a conceptual diagram of one example for showing one output image containing a normal image and a selected image being captured.

In still another possible case, a normal image associated with no moving image data and a selected image associated with moving image data are contained in one output image (collage print), as shown in FIG. 8.

When such an output image is captured, the digest moving image generator 28 can generate digest moving image data from associated moving image data associated with a specific management marker specified from a management marker of the normal image as acquired by the image analyzer 24.

Figure 9A:
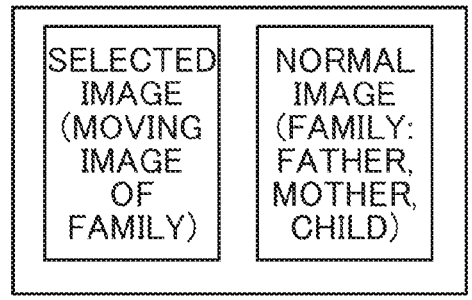
FIG. 9A is a conceptual diagram of one example for showing one output image containing a selected image associated with a moving image of a family and a normal image of the family.

For example, FIG. 9A shows an example in which a selected image associated with moving image data obtained by imaging family members and a normal image in which the family members (father, mother and their child) are seen are contained in one output image that has been output for themselves. In this case, the digest moving image generator 28 generates digest moving image data by picking out a part where the family members show up from associated moving image data associated with a specific management marker specified from a management marker of the normal image.

Figure 9B:
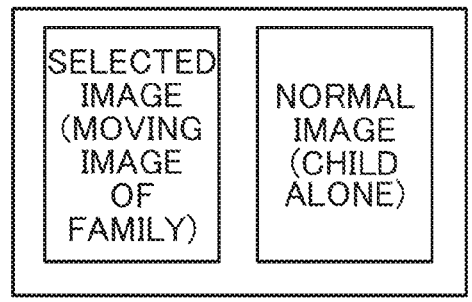
FIG. 9B is a conceptual diagram of one example for showing one output image containing a selected image associated with a moving image of a family and a normal image of a child alone.

FIG. 9B shows an example in which a selected image associated with moving image data obtained by imaging family members and a normal image obtained by imaging a child (grandparents' grandchild) alone are contained in one output image that has been output as a gift for the grandparents. In this case, the digest moving image generator 28 generates digest moving image data by picking out a part where the child shows up from associated moving image data associated with a specific management marker specified from a management marker of the normal image.

When, of a normal image and a selected image in one output image, only the selected image is captured, the digest moving image generator 28 generates digest moving image data by picking out a part of associated moving image data associated with a specific management marker specified from a management marker of the selected image.

A selected image and a normal image need not necessarily be printed on a single mount as in the examples above. For example, one possible case is to have an output image of a selected image and an output image of a normal image arranged side by side in an album.

When the output image of the selected image and the output image of the normal image are captured at one time, the digest moving image generator 28 can generate digest moving image data from associated moving image data associated with a specific management marker specified from a management marker of the normal image.

Figure 10:
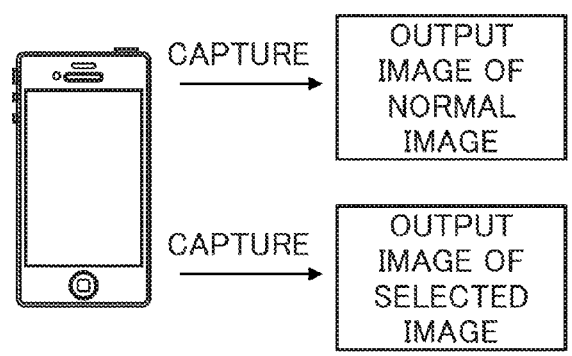
FIG. 10 is a conceptual diagram of one example for showing a normal image being captured and an output image of a selected image being subsequently captured.

An output image of a normal image and an output image of a selected image need not necessarily be captured at one time and may be captured sequentially as shown in FIG. 10.

In this case, the digest moving image generator 28 can generate digest moving image data from associated moving image data associated with a specific management marker specified from a management marker of the normal image.

In the example above, a person may be imaged instead of capturing the output image of the normal image, and then the output image of the selected image is captured, for instance.

In this case, the digest moving image generator 28 can generate digest moving image data by picking out, from associated moving image data associated with a specific management marker specified through person recognition performed by the image analyzer 24, a part where the person recognized through the person recognition shows up.

Next, a method of determining playback content of a digest moving image will be described.

The content playback system 10 generates digest moving image data from associated moving image data associated with a specific management marker specified from a management marker of a captured image.

Exemplary captured images include, in addition to a selected image(s) corresponding to one or more pieces of selected image data which have been selected by the user from among one or more pieces of still image data extracted from moving image data, a normal image captured together with a selected image, and a normal image captured or an image of a person taken before a selected image is captured, as described above.

Figure 11:
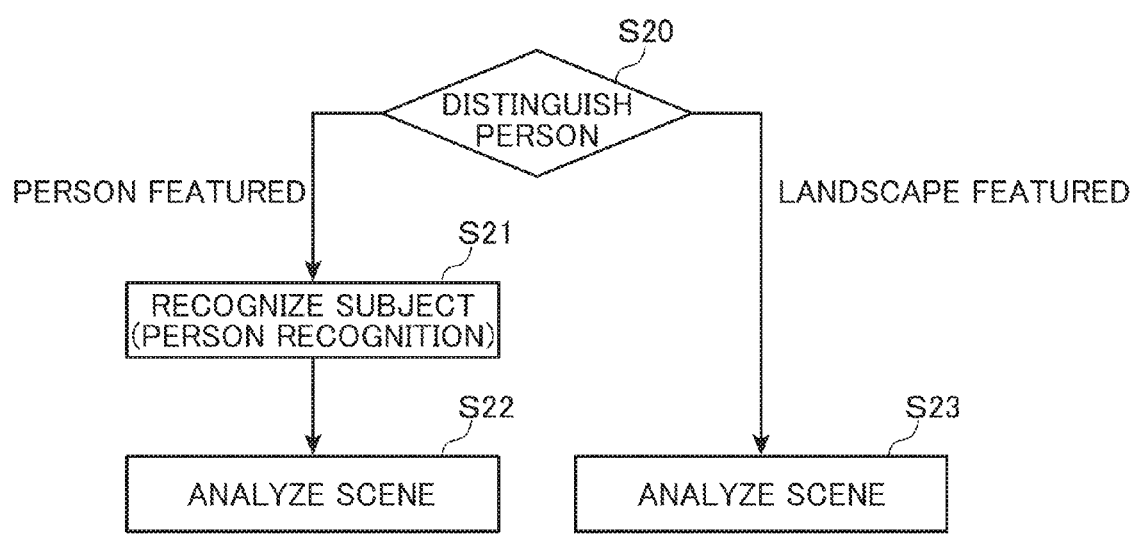
FIG. 11 is a flowchart of one example for showing the operation of the content playback system when playback content of a digest moving image is determined.

To be more specific, as shown in the flowchart of FIG. 11, the image analyzer 24 first distinguishes a person to determine whether a captured image in question is an image featuring a person or landscape in image analysis of the captured image (Step S20).

In this step, the image analyzer 24 detects the direction, size, position, number and the like of a face(s) of a person(s) seen in the captured image and determines whether the captured image is an image featuring a person or landscape based on at least one of the detection results.

Figure 12:
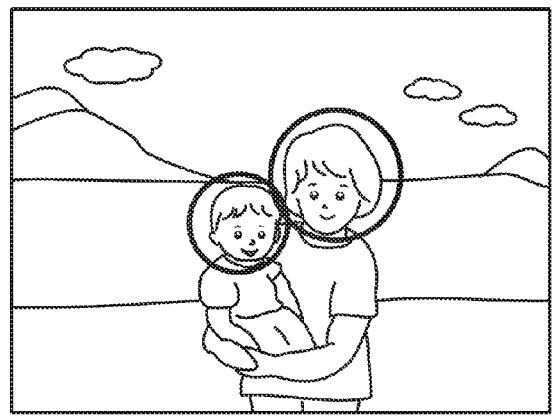
FIG. 12 is a conceptual diagram of one example of an image featuring a person(s).

The image analyzer 24 can determine that the captured image is an image featuring a person when, for instance, such conditions that full faces are seen, the face sizes are large in the image, the faces are positioned around the center, and the number of faces is plural are satisfied as shown in FIG. 12. On the other hand, when no face is seen or when a face is seen but as a small figure near the edge of the captured image, the image analyzer 24 can determine that the captured image is an image featuring the landscape.

When the captured image is determined to be an image featuring a person ("person featured" in Step S20), the digest moving image generator 28 can generate digest moving image data by picking out a part where a person shows up from associated moving image data corresponding to the captured image.

When the captured image is determined to be an image featuring a person, the image analyzer 24 recognizes a person in the captured image (person recognition) (Step S21).

In this case, the digest moving image generator 28 can generate digest moving image data featuring the person by picking out a part where the person shows up from associated moving image data associated with a management marker specified through the person recognition.

Furthermore, when the captured image is determined to be an image featuring a person, the image analyzer 24 performs scene analysis (scene of sea, greenery, mountain, sand beach, evening view, night view, or the like) on the captured image (Step S22).

In this case, the digest moving image generator 28 can generate digest moving image data by picking out a part where the person shows up in the same scene as a scene in the captured image from associated moving image data associated with a specific management marker specified through the person recognition and the scene analysis.

Figure 13:
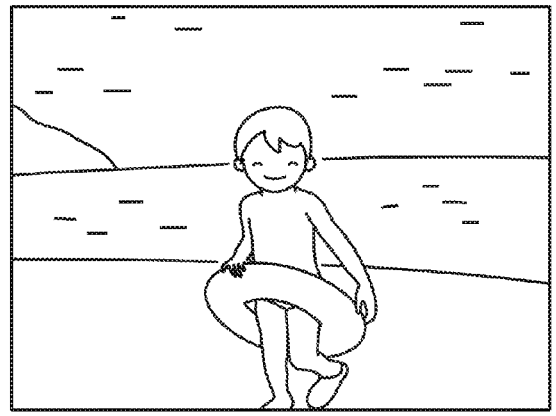
FIG. 13 is a conceptual diagram of one example of an image which features a person, showing a child A and a scene of sea.

When the captured image is determined to be an image featuring a person, in which a child A is seen, and which shows a scene of sea as shown in FIG. 13, the digest moving image generator 28 picks out a part where the child A shows up in a scene of sea from associated moving image data to thereby generate digest moving image data.

When the captured image is determined to be an image featuring a person, the image analyzer 24 need not necessarily perform scene analysis and may perform only person recognition.

On the other hand, when the captured image is determined to be an image featuring the landscape ("landscape featured" in Step S20), the image analyzer 24 performs scene analysis on the captured image (Step S23).

In this case, the digest moving image generator 28 can generate digest moving image data by picking out a part where the same scene as a scene in the captured image appears from associated moving image data associated with a specific management marker specified through the scene analysis.

Aside from that, the digest moving image generator 28 preferably generates digest moving image data by picking out a part including sounds preferentially over parts with no sound from associated moving image data.

In addition, it is preferable to generate digest moving image data by picking out a part having higher image quality (i.e., a part which is not too bright, not too dark, with less hand shake, for example) than reference image quality set in advance preferentially over parts having lower image quality than the reference image quality from associated moving image data.

In addition, it is preferable to take the movement of the image capturing section 32 into consideration, specifically, to exclude a part shot by the image capturing section 32, which has shot an associated moving image corresponding to the associated moving image data, in motion (i.e., a part during zooming, panning side to side, tilting up and down, and the like) from associated moving image data and generate digest moving image data.

Next, the control of playback time of a digest moving image will be described.

Setting the playback time of a digest moving image appropriately is an important factor in generating an effective digest moving image. If the playback time is too long, the user viewing the digest moving image should be tired and discouraged from repeatedly viewing the image. In contrast, when the playback time is too short, a part important for the user may be excluded, which makes the digest moving image less attractive. Therefore, when a digest moving image is generated, it is preferable to appropriately set the playback time.

The content playback system 10 determines the playback time of a digest moving image based on information on the type of the mobile terminal 14, the image content of the moving image, the motion of the subject in the moving image, the image quality of the moving image, the playback time of the original moving image, the movement of the mobile terminal 14 and the output image captured to obtain a captured image, and other factors.

There are differences described below between the case where the mobile terminal 14 is a portable terminal such as a smart phone and the case where it is a tablet terminal. A portable terminal is characterized in that, for instance, the playback of a digest moving image is often enjoyed on an individual basis and the screen of the touch panel 42 (display section 36) is small. A tablet terminal is characterized in that, for instance, the playback of a digest moving image is often enjoyed with others and the screen of the touch panel 42 (display section 36) is large.

When the screen of the touch panel 42 (display section 36) is small, the playback time of a digest moving image is preferably short in order to allow the user to avoid eyestrain. Accordingly, the digest moving image generator 28 generates digest moving image data so that the playback time thereof is longer with increasing screen size of the touch panel 42 (display section 36).

When the image content of the moving image features a person, the moving image is characterized in that, for instance, it is enjoyable to see the motion of the person and the image contains sounds. In contrast, when the image content features the landscape, less changes occur compared to the image content featuring a person and therefore, the playback time is preferably short. Accordingly, the digest moving image generator 28 generates digest moving image data so that the playback time of a part where a person shows up is longer than that of a part with no person.

When the motion of the subject is large in the moving image, for instance, when the moving image shows a child who is running around, the moving image is enjoyable to see and therefore, the playback time is preferably long. In contrast, when the motion of the subject is small, the playback time is preferably short. Accordingly, the digest moving image generator 28 generates digest moving image data so that the playback time thereof is longer with increasing motion of the subject who is seen in the captured image.

When the image quality (exposure, degree of blurring, and the like) of the moving image is excellent (adequate exposure, no hand shake, and the like), the moving image should be appropriate for viewing and therefore, the playback time is preferably long. Accordingly, the digest moving image generator 28 generates digest moving image data so that the playback time of a moving image with high image quality is longer than that of a moving image with low image quality.

When the playback time of the original moving image (associated moving image) data is long, the data is very likely to contain various scenes and various motions and presumably, the videographer has shot the moving image with strong feeling. Therefore, the playback time of the resultant digest moving image is preferably long. Accordingly, the digest moving image generator 28 generates digest moving image data so that the playback time thereof is longer with increasing playback time of the associated moving image data.

Figure 14:
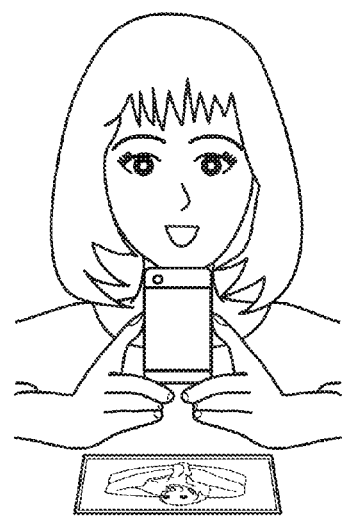
FIG. 14 is a conceptual diagram of one example for showing a user sitting in a chair who is capturing an output image on a desk with a mobile terminal held by her hands.

When the movement of the mobile terminal 14 and the output image is small, one possibility is that, as shown in FIG. 14 for example, the user sitting in a chair has captured the output image on a table with the mobile terminal 14 held by her hands. In this case, the resultant digest moving image can be playbacked and displayed in a calm environment, that is, the user can take time to see the digest moving image. Therefore, the playback time is preferably long.

On the other hand, when the movement of the mobile terminal 14 and the output image is large, one possibility is that, for instance, the user in a standing position has captured the output image as holding the mobile terminal 14 by one hand and the output image by the other hand. In this case, the user is not in a very calm environment and therefore, the playback time is preferably short.

The image analyzer 24 can determine the movement of the mobile terminal 14 and the output image through, for instance, the degree of blurring of the captured image. Specifically, when the captured image has severe blurring, it is determined that the movement of the mobile terminal 14 and the output image was large, whereas when the captured image has slight blurring, it is determined that the movement of the mobile terminal 14 and the output image was small. The movement of the mobile terminal 14 may be determined with a gyro sensor or the like in the mobile terminal 14. Accordingly, the digest moving image generator 28 generates digest moving image data so that the playback time in the case of a captured image having slight blurring is longer than that in the case of a captured image having severe blurring.

Captured images may be images arranged in pages of a photo book.

The photo book is a photo album of booklet type including prints or electronic data and has plural pages the user has created by laying out plural images with the use of a personal computer (PC) or the like.

For example, when an output image of a selected image and an output image of a normal image are arranged in one page of a photo book, the image capturing section 32 may capture the output image of the normal image and the output image of the selected image arranged in the page of the photo book at one time.

In this case, the digest moving image generator 28 can generate digest moving image data from associated moving image data associated with a specific management marker specified from a management marker of the normal image.

As a captured image, use may be made of a stored image obtained by imaging the face of the user of the mobile terminal 14 and stored in the mobile terminal 14.

In this case, the image analyzer 24 performs image analysis on stored image data corresponding to the stored image. The digest moving image generator 28 can generate digest moving image data by picking out a part where the user of the mobile terminal 14 shows up from associated moving image data associated with a specific management marker specified from a management marker of the stored image.

Figure 15:
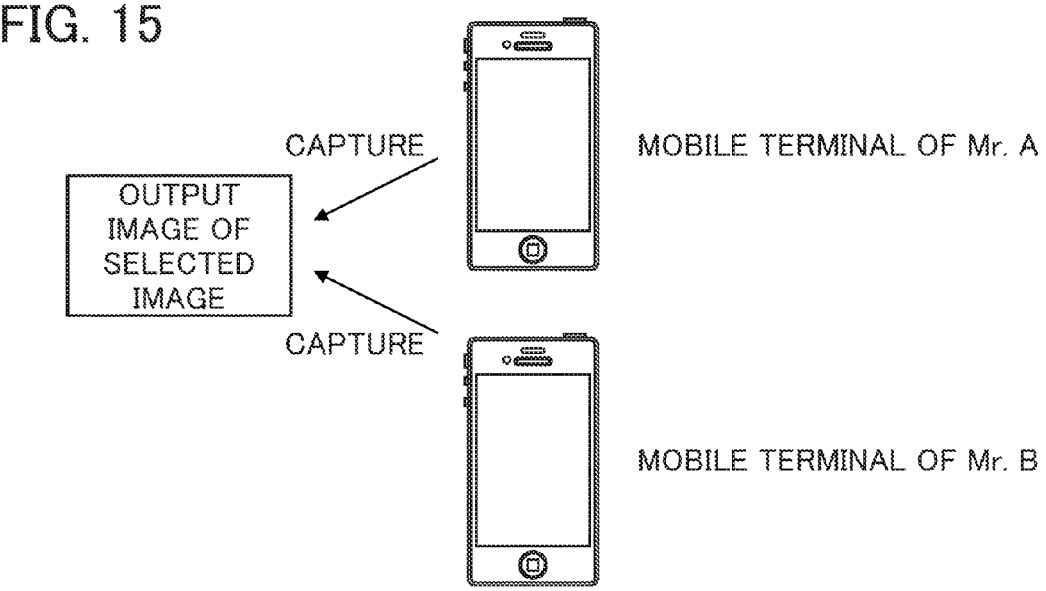
FIG. 15 is a conceptual diagram of one example for showing an output image of a selected image being captured with mobile terminals of persons A and B.

It is possible to playback a digest moving image featuring a person A when an output image of a selected image is captured with a smart phone possessed by the person A, and playback a digest moving image featuring a person B when the output image of the selected image is captured with a smart phone possessed by the person B, as shown in FIG. 15.

Figure 16:
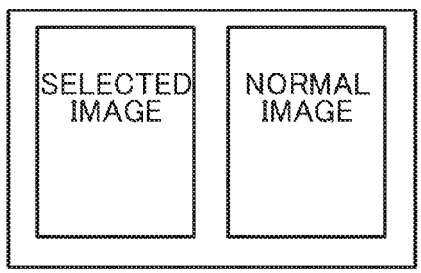
FIG. 16 is a conceptual diagram of one example for showing one output image containing a normal image and a selected image.

When an output image containing a normal image and a selected image as shown in FIG. 16 is captured, the digest moving image generator 28 may generate digest moving image data including normal image data corresponding to the normal image from the normal image data and associated moving image data associated with a specific management marker specified from a management marker of the normal image. In other words, the normal image may be playbacked or displayed in the resultant digest moving image.

In addition, one piece of digest moving image data may be generated based on two or more output images, each of the two or more output images being obtained by outputting of each of two or more selected images corresponding to each of two or more pieces of the selected image data associated with different pieces of moving image data.

Figure 17:
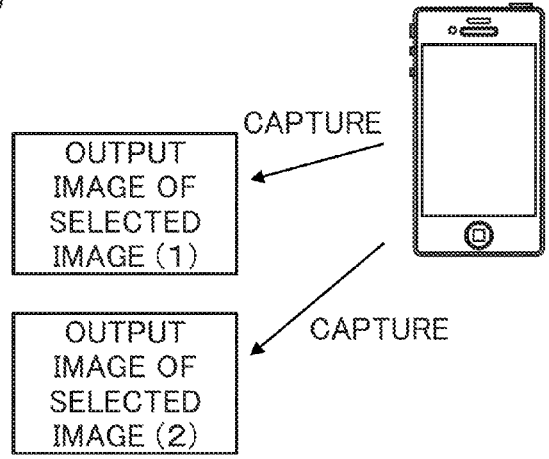
FIG. 17 is a conceptual diagram of one example for showing output images of selected images associated with different moving images being captured.

When two or more output images, each of which is obtained by outputting of each of two or more selected images corresponding to each of two or more pieces of the selected image data associated with different pieces of moving image data, are captured as shown in FIG. 17, the digest moving image generator 28 may combine two or more pieces of associated moving image data respectively corresponding to the captured two or more selected images to thereby generate one piece of digest moving image data.

The devices used in the present invention may be each composed of constituent elements that are dedicated hardware devices or of a computer in which operations of the constituent elements are programmed.

The method of the present invention can be carried out by, for instance, a program that causes a computer to implement steps of the method. A computer readable recording medium having the program recorded therein may also be provided.

This invention is basically as described above.

While the present invention has been described above in detail, the invention is not limited to the above embodiment, and various improvements and modifications may be made without departing from the spirit and scope of the invention.

What is claimed is:

1. A content playback system, comprising:
a server; and
a mobile terminal connected to the server via a network, wherein the server comprises:
a storage, for one piece of moving image data or each of two or more pieces of moving image data, that stores a piece of selected image data or specific information thereon in association with the relevant piece of moving image data as a management marker of a selected image corresponding to the piece of selected image data or the specific information, the piece of selected image data or the specific information being a piece of still image data selected from among one or more pieces of still image data extracted from the piece of moving image data, and
the mobile terminal comprises:
an image capturing section that captures an output image obtained by outputting the selected image to thereby obtain captured image data, and
wherein the server further comprises:
an image analyzer that performs image analysis on the captured image data to acquire a management marker of a captured image corresponding to the captured image data;
a management marker specifying section that specifies, as a specific management marker, a management marker of a selected image corresponding to the management marker of the captured image from among management markers of selected images previously stored in the storage prior to capturing the output image; and
a digest moving image generator that generates digest moving image data by picking out a part of associated moving image data that is moving image data associated with the specific management marker, and
the mobile terminal further comprises:
a display section that playbacks and displays a digest moving image corresponding to the digest moving image data; and
a controller that performs control so that when the output image is captured by the image capturing section, a digest moving image corresponding to digest moving image data generated based on the captured image data is playbacked and displayed on the display section.

2. The content playback system according to claim 1, wherein the digest moving image generator generates the digest moving image data by picking out, from the associated moving image data, a part corresponding to a previously-set time range that includes a shooting time of a selected image corresponding to the specific management marker.

3. The content playback system according to claim 1, wherein when a selected image corresponding to the specific management marker is an image featuring a person, the digest moving image generator generates the digest moving image data by picking out a part where a person shows up from the associated moving image data.

4. The content playback system according to claim 1, wherein when a selected image corresponding to the specific management marker is an image featuring landscape, the digest moving image generator generates the digest moving image data by picking out a part where no person shows up from the associated moving image data.

5. The content playback system according to claim 1, wherein when an output image obtained by outputting two or more selected images corresponding to two or more pieces of the selected image data or the specific information associated with one piece of moving image data is captured by the image capturing section and when each of shooting times of a selected image corresponding to each of two or more specific management markers specified from each of the two or more selected images captured falls within a time interval set in advance, the digest moving image generator generates the digest moving image data by picking out, from the associated moving image data, a part corresponding to a time range between earliest and latest shooting times of the two or more selected images corresponding to the two or more specific management markers specified.

6. The content playback system according to claim 1, wherein when an output image obtained by outputting two or more selected images corresponding to two or more pieces of the selected image data or the specific information associated with one piece of moving image data is captured by the image capturing section and when a person is seen in each of the two or more selected images corresponding to the two or more specific management markers specified from each of the two or more selected images captured, the digest moving image generator generates the digest moving image data by picking out, from the associated moving image data, a part where each of the persons seen in each of the two or more selected images corresponding to each of the two or more specific management markers specified shows up.

7. The content playback system according to claim 1, wherein when an output image obtained by outputting a normal image associated with no moving image data and the selected image is captured by the image capturing section, the digest moving image generator generates the digest moving image data from associated moving image data associated with a specific management marker specified from a management marker of the normal image acquired by the image analyzer.

8. The content playback system according to claim 1, wherein when an output image obtained by outputting a normal image associated with no moving image data and an output image obtained by outputting the selected image are captured at one time by the image capturing section, the digest moving image generator generates the digest moving image data from associated moving image data associated with a specific management marker specified from a management marker of the normal image acquired by the image analyzer.

9. The content playback system according to claim 1, wherein when an output image obtained by outputting a normal image associated with no moving image data and an output image obtained by outputting the selected image are sequentially captured by the image capturing section, the digest moving image generator generates the digest moving image data from associated moving image data associated with a specific management marker specified from a management marker of the normal image acquired by the image analyzer.

10. The content playback system according to claim 1, wherein when the image capturing section images a person and then captures an output image obtained by outputting the selected image, the digest moving image generator generates the digest moving image data from associated moving image data associated with a specific management marker specified through person recognition performed by the image analyzer on the person.

11. The content playback system according to claim 1, wherein the image analyzer determines whether the captured image is an image featuring a person or landscape based on at least one of direction, size, position, and number of faces of persons seen in the captured image, and when the captured image is determined to be an image featuring a person, the image analyzer performs person recognition on a person seen in the captured image, and wherein the digest moving image generator generates the digest moving image data by picking out a part where the person shows up from associated moving image data associated with a specific management marker specified through the person recognition.

12. The content playback system according to claim 1, wherein the image analyzer determines whether the captured image is an image featuring a person or landscape based on at least one of direction, size, position, and number of faces of persons seen in the captured image, and when the captured image is determined to be an image featuring landscape, the image analyzer performs scene analysis on the captured image, and wherein the digest moving image generator generates the digest moving image data by picking out a part where a same scene as a scene in the captured image is seen from associated moving image data associated with a specific management marker specified through the scene analysis performed by the image analyzer.

13. The content playback system according to claim 1, wherein when an output image obtained by outputting a normal image associated with no moving image data and an output image obtained by outputting the selected image, which are arranged in a page of a photo book, are captured at one time by the image capturing section, the digest moving image generator generates the digest moving image data from associated moving image data associated with a specific management marker specified from a management marker of the normal image acquired by the image analyzer.

14. The content playback system according to claim 1, wherein the image analyzer performs image analysis on stored image data corresponding to a stored image obtained by imaging a face of a user of the mobile terminal and stored in the mobile terminal, and wherein the digest moving image generator generates the digest moving image data by picking out a part where the user of the mobile terminal shows up from associated moving image data associated with a specific management marker specified from a management marker of the stored image acquired by the image analyzer.

15. The content playback system according to claim 1, wherein when an output image obtained by outputting a normal image associated with no moving image data and the selected image is captured by the image capturing section, the digest moving image generator generates the digest moving image data including the normal image data from associated moving image data associated with a specific management marker specified from a management marker of the normal image acquired by the image analyzer.

16. The content playback system according to claim 1, wherein when two or more output images, each of the two or more output images being obtained by outputting each of two or more selected images corresponding to each of two or more pieces of the selected image data or the specific information associated with different pieces of moving image data, are captured by the image capturing section, the digest moving image generator combines two or more pieces of associated moving image data respectively corresponding to the two or more selected images captured to thereby generate one piece of the digest moving image data.

17. A server connected to a mobile terminal via a network, comprising:

a storage, for one piece of moving image data or each of two or more pieces of moving image data, that stores a piece of selected image data or specific information thereon in association with the relevant piece of moving image data as a management marker of a selected image corresponding to the piece of selected image data or the specific information, the piece of selected image data or the specific information being a piece of still image data selected from among one or more pieces of still image data extracted from the piece of moving image data;

an image analyzer that performs image analysis on captured image data obtained by capturing, by an image capturing section of the mobile terminal, an output image obtained by outputting the selected image to thereby acquire a management marker of a captured image corresponding to the captured image data;

a management marker specifying section that specifies, as a specific management marker, a management marker of a selected image corresponding to the management marker of the captured image from among management markers of selected images previously stored in the storage prior to capturing the output image; and a digest moving image generator that generates digest moving image data by picking out a part of associated moving image data that is moving image data associated with the specific management marker.

18. A mobile terminal connected, via a network, to a server having a storage, for one piece of moving image data or each of two or more pieces of moving image data, that stores a piece of selected image data or specific information thereon in association with a piece of moving image data as a management marker of a selected image corresponding to the piece of selected image data or the specific information, the piece of selected image data or the specific information being a piece of still image data selected from among one or more pieces of still image data extracted from the piece of moving image data, the mobile terminal comprising:

an image capturing section that captures an output image obtained by outputting the selected image to thereby obtain captured image data;

a display section that playbacks and displays a digest moving image corresponding to digest moving image data when an image analyzer of the server performs image analysis on the captured image data to thereby acquire a management marker of a captured image corresponding to the captured image data, a management marker specifying section of the server specifies, as a specific management marker, a management marker of a selected image corresponding to the management marker of the captured image from among management markers of selected images previously stored in the storage prior to capturing the output image, and a digest moving image generator of the server generates the digest moving image data by picking out a part of associated moving image data that is moving image data associated with the specific management marker; and a controller that performs control so that when the output image is captured by the image capturing section, a digest moving image corresponding to digest moving image data generated based on the captured image data is playbacked and displayed on the display section.

19. A content playback method, comprising:

a step of, for one piece of moving image data or each of two or more pieces of moving image data, storing in a storage a piece of selected image data or specific information thereon in association with a piece of moving image data as a management marker of a selected image corresponding to the piece of selected image data or the specific information, the piece of selected image data or the specific information being a piece of still image data selected from among one or more pieces of still image data extracted from the piece of moving image data;

a step of capturing with an image capturing section an output image obtained by outputting the selected image to thereby obtain captured image data;

a step of performing image analysis by an image analyzer on the captured image data to acquire a management marker of a captured image corresponding to the captured image data;

a step of specifying by a management marker specifying section, as a specific management marker, a management marker of a selected image corresponding to the management marker of the captured image from among management markers of selected images stored in the storage;

a step of generating digest moving image data by a digest moving image generator by picking out a part of associated moving image data that is moving image data associated with the specific management marker; and a step of performing control by a controller so that when the output image is captured by the image capturing section, a digest moving image corresponding to digest moving image data generated based on the captured image data is playbacked and displayed on a display section, wherein the step of capturing occurs after the step of storing the management markers.

20. A non-transitory computer readable recording medium having recorded thereon a program for causing a computer to execute each of the steps of the content playback method according to claim 19.

* * * * *